US012000933B2

(12) United States Patent
Kern et al.

(10) Patent No.: US 12,000,933 B2
(45) Date of Patent: Jun. 4, 2024

(54) OPERATING METHOD FOR A LIDAR SYSTEM, CONTROL UNIT, LIDAR SYSTEM, AND DEVICE

(71) Applicant: Robert Bosch GmbH, Stuttgart (DE)

(72) Inventors: Oliver Kern, Renningen (DE); Gor Hakobyan, Stuttgart (DE); Robert Korn, Karlsruhe (DE)

(73) Assignee: ROBERT BOSCH GMBH, Stuttgart (DE)

( * ) Notice: Subject to any disclaimer, the term of this patent is extended or adjusted under 35 U.S.C. 154(b) by 919 days.

(21) Appl. No.: 17/043,137

(22) PCT Filed: Jun. 4, 2019

(86) PCT No.: PCT/EP2019/064508
§ 371 (c)(1),
(2) Date: Sep. 29, 2020

(87) PCT Pub. No.: WO2019/234034
PCT Pub. Date: Dec. 12, 2019

(65) Prior Publication Data
US 2021/0026018 A1    Jan. 28, 2021

(30) Foreign Application Priority Data
Jun. 7, 2018   (DE) .......................... 102018209013.0

(51) Int. Cl.
*G01S 17/931* (2020.01)
*G01S 7/481* (2006.01)
(Continued)

(52) U.S. Cl.
CPC .......... *G01S 17/931* (2020.01); *G01S 7/4814* (2013.01); *G01S 7/4911* (2013.01); *G01S 7/4917* (2013.01); *G01S 17/06* (2013.01); *G01S 17/58* (2013.01)

(58) Field of Classification Search
CPC .... G01S 17/931; G01S 7/4814; G01S 7/4911; G01S 7/4917; G01S 17/06; G01S 17/58
(Continued)

(56) References Cited

U.S. PATENT DOCUMENTS 5,835,199 A   11/1998  Phillips et al.
5,847,816 A   12/1998  Zediker et al.
(Continued)

FOREIGN PATENT DOCUMENTS

CN    1187882 A    7/1998
CN    1932553 A    3/2007
(Continued)

OTHER PUBLICATIONS

International Search Report for PCT/EP2019/064508, dated Sep. 26, 2019.

*Primary Examiner* — William Choi
(74) *Attorney, Agent, or Firm* — NORTON ROSE FULBRIGHT US LLP; Gerard A. Messina (57) ABSTRACT

An operating method for a LIDAR system. A laser device that includes an optical modulator optically coupled thereto for receiving and modulating the frequency of non-modulated light emitted by the laser device, using a frequency modulation function, and for outputting frequency-modulated light as primary light into a visual field, is used as a light source unit. Secondary light received from the visual field and non-modulated light of the laser device are optically superimposed to form superimposed detection light. The superimposed detection light is photoelectrically detected by generating and outputting a primary electrical detection signal that is representative of the detection light. For the evaluation, the primary electrical detection signal is electrically mixed with an electrical signal that is represen-
(Continued)

tative of the frequency modulation function of the optical modulator to form a first evaluation signal, and is assessed.

12 Claims, 6 Drawing Sheets

(51) Int. Cl.
*G01S 7/4911* (2020.01)
*G01S 7/4912* (2020.01)
*G01S 17/06* (2006.01)
*G01S 17/58* (2006.01)

(58) Field of Classification Search
USPC .......................................................... 359/238
See application file for complete search history.

(56) References Cited

U.S. PATENT DOCUMENTS

| 2013/0188167 | A1 | 7/2013 | Halmos |
| 2015/0185244 | A1 | 7/2015 | Inoue et al. |
| 2016/0377721 | A1 | 12/2016 | Lardin et al. |

FOREIGN PATENT DOCUMENTS

| CN | 105891841 | A | 8/2016 |
| CN | 106707291 | A | 5/2017 |
| CN | 107810396 | A | 3/2018 |

OPERATING METHOD FOR A LIDAR SYSTEM, CONTROL UNIT, LIDAR SYSTEM, AND DEVICE

FIELD

The present invention relates to an operating method for a LIDAR system, a control unit for a LIDAR system, a LIDAR system as such, and a working device, that is designed with a LIDAR system, and in particular a vehicle.

BACKGROUND INFORMATION

For detecting the surroundings of working devices and in particular of vehicles, so-called light detection and ranging (LIDAR) systems are being increasingly used which are designed to act on a visual field with light or infrared radiation, that is reflected back from the visual field, for analyzing the visual field and for detecting objects contained therein.

In LIDAR systems it would be desirable, using simple means and without complex equipment or operation, to allow improved detection of object distances and of object speeds in a visual field.

SUMMARY

An operating method according to an example embodiment of the present invention for a LIDAR system may have the advantage that, using comparatively simple means and without excessive additional equipment and processing complexity, improved detection of distances and speeds of objects in a visual field is possible. This may achieved according to the example embodiment of the present invention with an operating method for a LIDAR system is provided in which (i) a laser device that includes an optical modulator, coupled thereto, for receiving and for modulating the frequency of non-modulated light emitted by the laser device, using a frequency modulation function, and for outputting frequency-modulated light as primary light into a visual field, is used as a light source unit, (ii) secondary light received from the visual field and non-modulated light of the laser device are optically superimposed to form superimposed detection light, (iii) the superimposed detection light is photoelectrically detected by generating and outputting a primary electrical detection signal that is representative of the detection light, and (iv) for the evaluation, the primary electrical detection signal is electrically mixed with an electrical signal that is representative of the frequency modulation function of the optical modulator to form a first evaluation signal, and is assessed. By use of these measures, on the one hand use is made of advantages that accompany a frequency-modulated continuous wave (FMCW) method, such as an increased information flow, and on the other hand, due to the optical downmixing into the optical baseband and the electronic mixing out of the underlying modulation function, a particularly accurate determination of the parameters that are relevant for the scattering at objects in the visual field is possible.

Preferred refinements of the present invention are described herein.

In one preferred specific embodiment of the operating method according to the present invention, the received secondary light and the non-modulated light of the laser device are superimposed and brought into interference with one another in order to precisely match the light components, to be superimposed, during the optical superimposition.

In a further alternative or additional specific embodiment of the operating method according to the present invention, the electronic mixing of the primary electrical detection signal with the electrical signal, which is representative of the frequency modulation function, takes place for dechirping and for determining a beat frequency.

The beat frequency is understood in particular as the sum of a Doppler frequency that is representative of a speed of an object in the visual field, and a distance frequency that is representative of a distance of the object.

In order to advantageously differentiate and assess various result pairs for distances and speeds of objects, to be determined, in the visual field for assessing the first evaluation signal, according to a further advantageous refinement of the operating method according to the present invention it is provided that for the evaluation, the primary electrical detection signal is directly converted to a second evaluation signal and assessed, in particular with regard to the first evaluation signal.

A joint assessment of the first evaluation signal with the second evaluation signal takes place, in particular with regard to their interdependence.

In the first evaluation signal, the frequency of a main signal component is ascertained as the beat frequency, it being possible in particular to use an appropriate Fourier analysis.

Based on the second evaluation signal, the beat frequency derived from the first evaluation signal, and/or data for defining the frequency modulation function, values that are representative of a speed of an object in the visual field and of a distance of the object may be ascertained using an estimation method, preferably a maximum likelihood estimation method.

According to a further aspect of the present invention, a control unit for a LIDAR system is provided which is configured to implement and/or control one specific embodiment of the operating method according to the present invention in an underlying LIDAR system.

Moreover, the present invention relates to a LIDAR system as such, which is designed with a transmitter optical system that is configured to generate and emit pulses of primary light into a visual field for illuminating same, a receiver optical system that is configured to receive, detect, and evaluate secondary light from the visual field, and a control unit according to the present invention that is configured to control the operation of the transmitter optical system and/or of the receiver optical system.

In one advantageous refinement of the LIDAR system according to the present invention, the transmitter optical system includes a laser device as a light source unit, including an optical modulator that is optically coupled thereto and is configured to receive and to modulate the frequency of the non-modulated light emitted by the laser device, using a frequency modulation function, and to output frequency-modulated light as primary light into the visual field.

Alternatively or additionally, the receiver optical system of the LIDAR system according to the present invention includes an optical combiner or mixer that is configured to optically superimpose secondary light, received from the visual field, with non-modulated light of the laser device to form superimposed detection light.

Within the meaning of the present invention, non-modulated light of the laser device is understood to mean the light that is directly output by the laser device, i.e., the pure CW signal prior to passing through the frequency modulator. In contrast, modulated light is understood to mean the light of the laser device after passing through the frequency modulator, i.e., the laser light that is modified based on the frequency ramp of the modulation function.

Additionally or alternatively, an electronic mixer is provided which is configured to electronically mix a primary detection signal, which is representative of the superimposed detection light, with an electrical signal, which is representative of the frequency modulation function of the optical modulator, in order to generate a first evaluation signal.

Furthermore, as an application the present invention provides a working device that is provided with a LIDAR system designed according to the present invention, in particular as a vehicle.

BRIEF DESCRIPTION OF THE DRAWINGS

Specific embodiments of the present invention are described in detail herein with reference to the figures.

DETAILED DESCRIPTION OF EXAMPLE EMBODIMENTS

Exemplary embodiments of the present invention and the technical background are described in greater detail below with reference to FIGS. 1 through 6. Elements and components that are identical and equivalent and that function in an identical or equivalent manner are denoted by the same reference numerals. A detailed description of the denoted elements and components is not provided in each case of their occurrence.

The described features and other properties may be arbitrarily separated from one another and arbitrarily combined with one another without departing from the core of the present invention.

Figure 1:
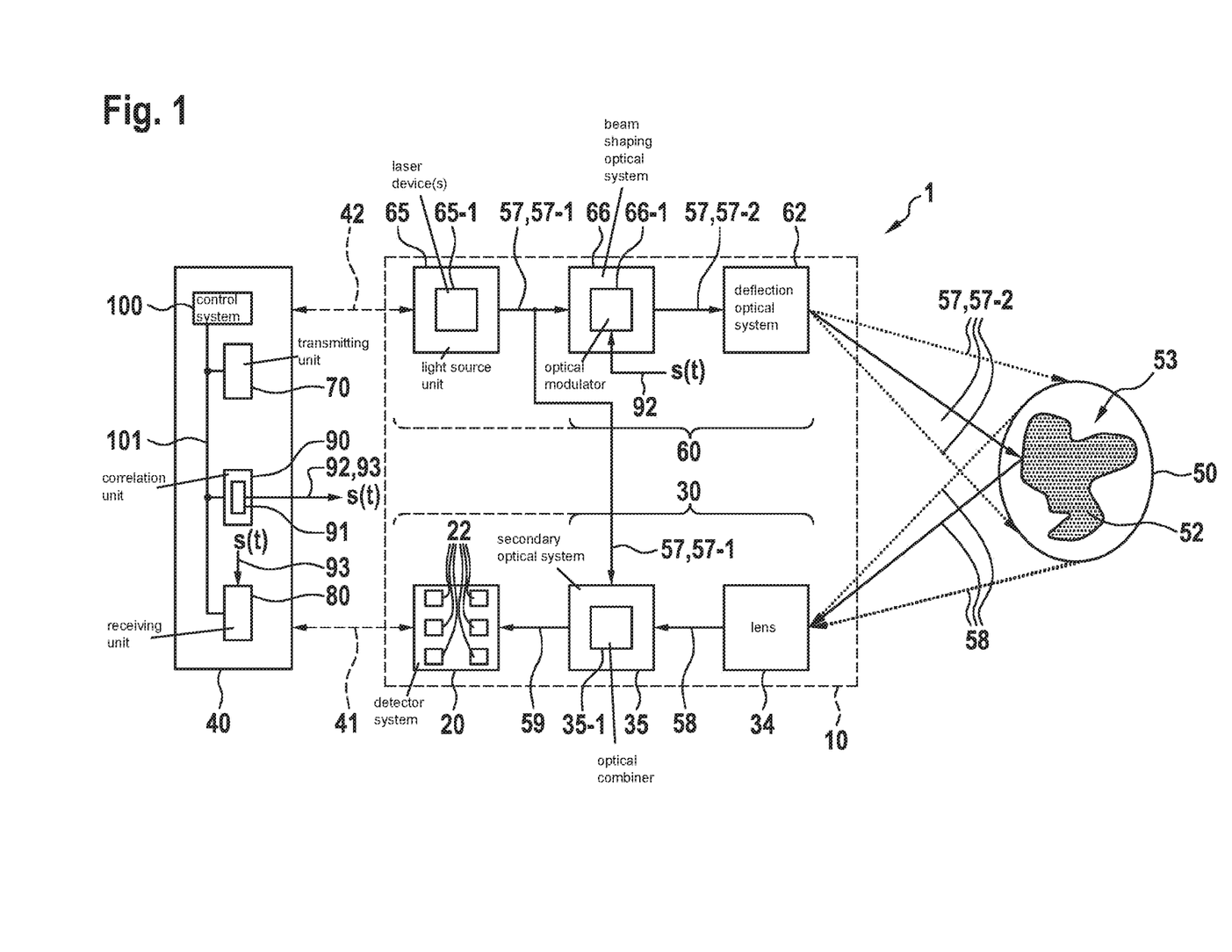
FIG. 1 shows one specific embodiment of the LIDAR system according to the present invention in the form of a schematic block diagram.

FIG. 1 schematically shows one specific embodiment of LIDAR system 1 according to the present invention in the form of a block diagram.

LIDAR system 1, illustrated in FIG. 1 strictly by way of example and configured for FMCW operation, is made up of a control and evaluation unit 40, in addition to optical system 10 on which the operation of LIDAR system 1 is based, including a light source unit 65, for example including one or multiple laser devices 65-1, a transmitter optical system 60, a receiver optical system 30, and a detector system 20. The control of the operation of LIDAR system 1 and the evaluation of the signals received by LIDAR system 1 are carried out by control and evaluation unit 40.

During operation, light source unit 65 is prompted to generate and output primary light 57 by controlling and prompting with the aid of control and evaluation unit 40 via a control line 42. Primary light 57 is modeled with the aid of a beam shaping optical system 66, depending on the application, and with the aid of a transmission-side deflection optical system 62 is then emitted into a visual field 50 with an object 52 of a scene 53 contained therein.

According to the present invention, beam shaping optical system 66 includes an optical modulator 66-1 that is controlled with a modulation signal s(t) via a control line 92 in order to modulate the optical frequency of received non-modulated primary light 57-1 and output it as modulated primary light 57-2 to deflection optical system 62.

The light reflected from visual field 50 and from object 52 is also referred to as secondary light 58, and is received in receiver optical system 30 with the aid of a lens 34, further treated by a provided secondary optical system 35, and then transmitted to a detector system 20 that includes one or multiple sensor elements or detector elements 22. Sensor elements 22 of detector system 20 generate signals which represent secondary light 58, and which are transmitted to control and evaluation unit 40 with the aid of a control and measuring line 41.

According to the present invention, secondary optical system 35 includes an optical combiner 35-1 or mixer that is configured to suitably optically superimpose received secondary light 58 with non-modulated primary light 57-1 and to obtain superimposed detection light 59, also referred to as superimposition light.

The specific embodiment of control and evaluation unit 40 according to FIG. 1 is made up of a higher-order control system 100 that is connected to a transmitting unit 70, to a receiving unit 80, and to a correlation unit 90 with the aid of a bus 101.

Control system 100 and units 70, 80, and 90 may actually be designed as separate components within control and evaluation unit 40.

However, a LIDAR system 1 is also possible in which one or multiple of the components of control and evaluation unit 40 are combined with one another and have an integrated design, so that the illustration according to FIG. 1 is used only to show the principle of the components that are present; however, the specific architecture is not necessarily depicted, and may deviate from the illustration from FIG. 1.

In the specific embodiment, described here, of LIDAR system 1 shown in FIG. 1, correlation unit 90 includes a modulation unit 91 that is configured to generate an electrical control signal that corresponds to modulation function s(t), and to supply it, via control lines 92 and 93 of beam shaping optical system 66, to optical modulator 66-1 or receiving unit 80.

However, this design is not mandatory. Instead, modulation unit 91 may be situated at some other location in LIDAR system 1, as long as it is ensured that the electrical control signal associated with modulation function s(t) is provided to optical modulator 66-1 as well as to receiving unit 80, and at that location to provided electronic mixer 81, as described below in conjunction with FIG. 2.

Figure 2:
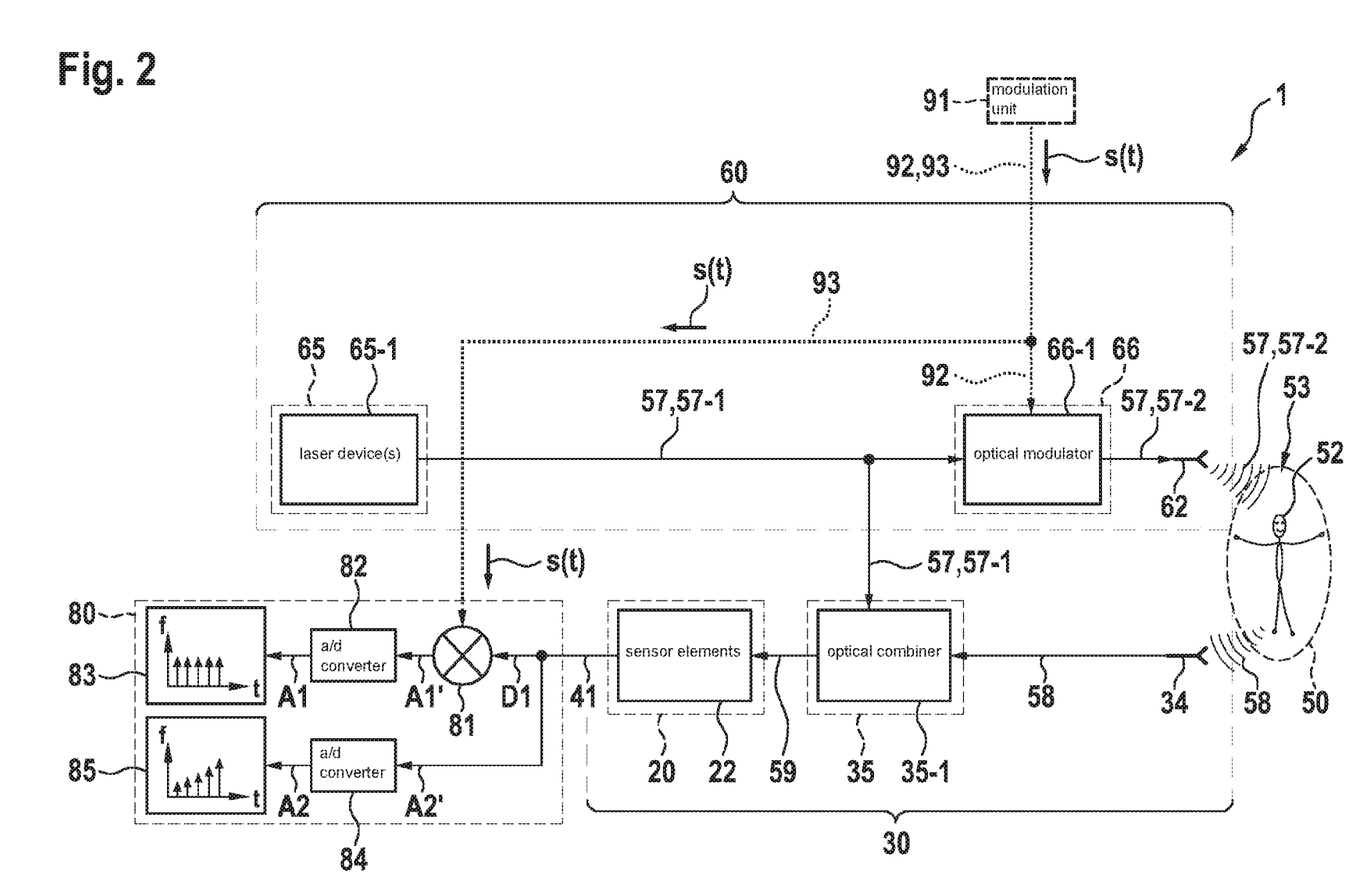
FIG. 2 shows one specific embodiment of the LIDAR system according to the present invention, likewise in the form of a schematic block diagram.

FIG. 2 shows one specific embodiment of LIDAR system 1 according to the present invention, likewise in the form of a schematic block diagram.

It is explained here in greater detail how on the one hand the process of optical superimposition takes place, and on the other hand, how generated superimposition light 59 is further processed, after the detection, by electrical conversion in detector element 22 of detector system 20 and transmission to receiving unit 80.

In receiving unit 80, after transmission of primary detection signal D1 in an analogous form in conjunction with modulation signal s(t) or an electrical signal that is representative thereof, a mixed signal as first evaluation signal A1' is generated in an analogous form in electronic mixer 81, which is provided in receiving unit 80, and in a downstream analog/digital converter 82 is converted to first evaluation signal A1 in digital form and analyzed in a first evaluation unit 83.

Due to the mixing operation, the signature of underlying modulation signal s(t) is removed, in a manner of speaking, from detection signal D1, so that after analog-to-digital conversion in evaluation unit 83, the frequency of the main component as a so-called beat frequency may be ascertained comparatively accurately.

As described above and explained below, the beat frequency thus ascertained essentially represents the sum of a Doppler frequency that is characteristic for an object movement, and a distance frequency that is characteristic for an object distance.

As described above, the individual summands that result in the beat frequency as a summed frequency are initially undetermined, and may be determined, for example, by analyzing primary detection signal D1, which is understood as second evaluation signal A2' and which after analog-to-digital conversion in analog/digital converter 84 is referred to as second evaluation signal A2, and with knowledge of modulation function s(t).

For this purpose, FIGS. 3 through 6 illustrate detailed aspects of specific embodiments of the operating method according to the present invention for a LIDAR system 1, in the form of graphs 130 through 160.

Figure 3:
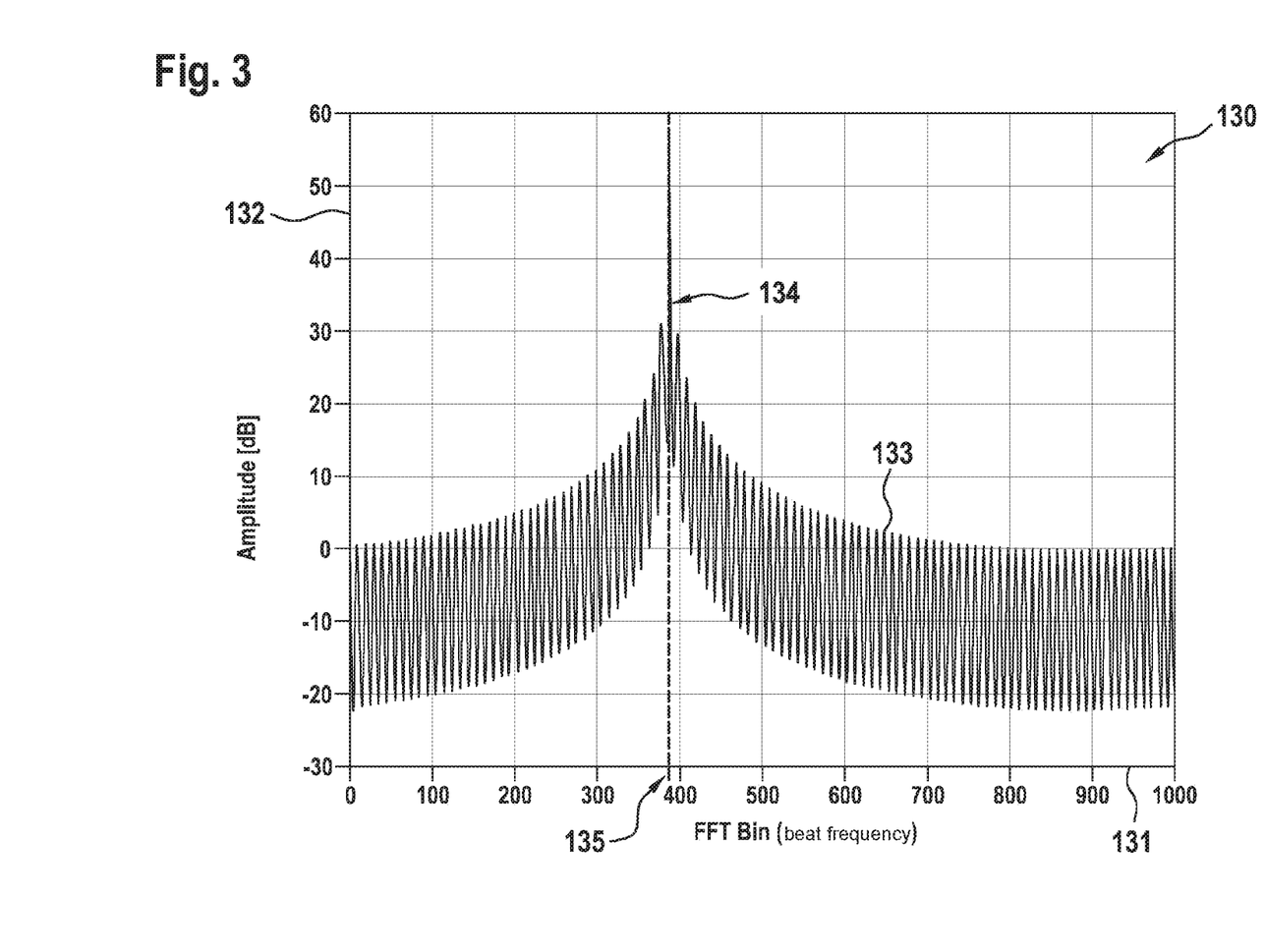
FIGS. 3 through 6 illustrate, in the form of graphs, detailed aspects of specific embodiments of the operating method according to the present invention.

First, the discrete Fourier transform of digital first evaluation signal A1 is illustrated in graph 130 of FIG. 3 as track 133. This means that the frequency is plotted on abscissa 131 of graph 130, and the corresponding amplitude of the Fourier transform is plotted on ordinate 132. Peak 134 of track 133 together with corresponding beat frequency 135 are apparent on abscissa 131.

Figure 4:
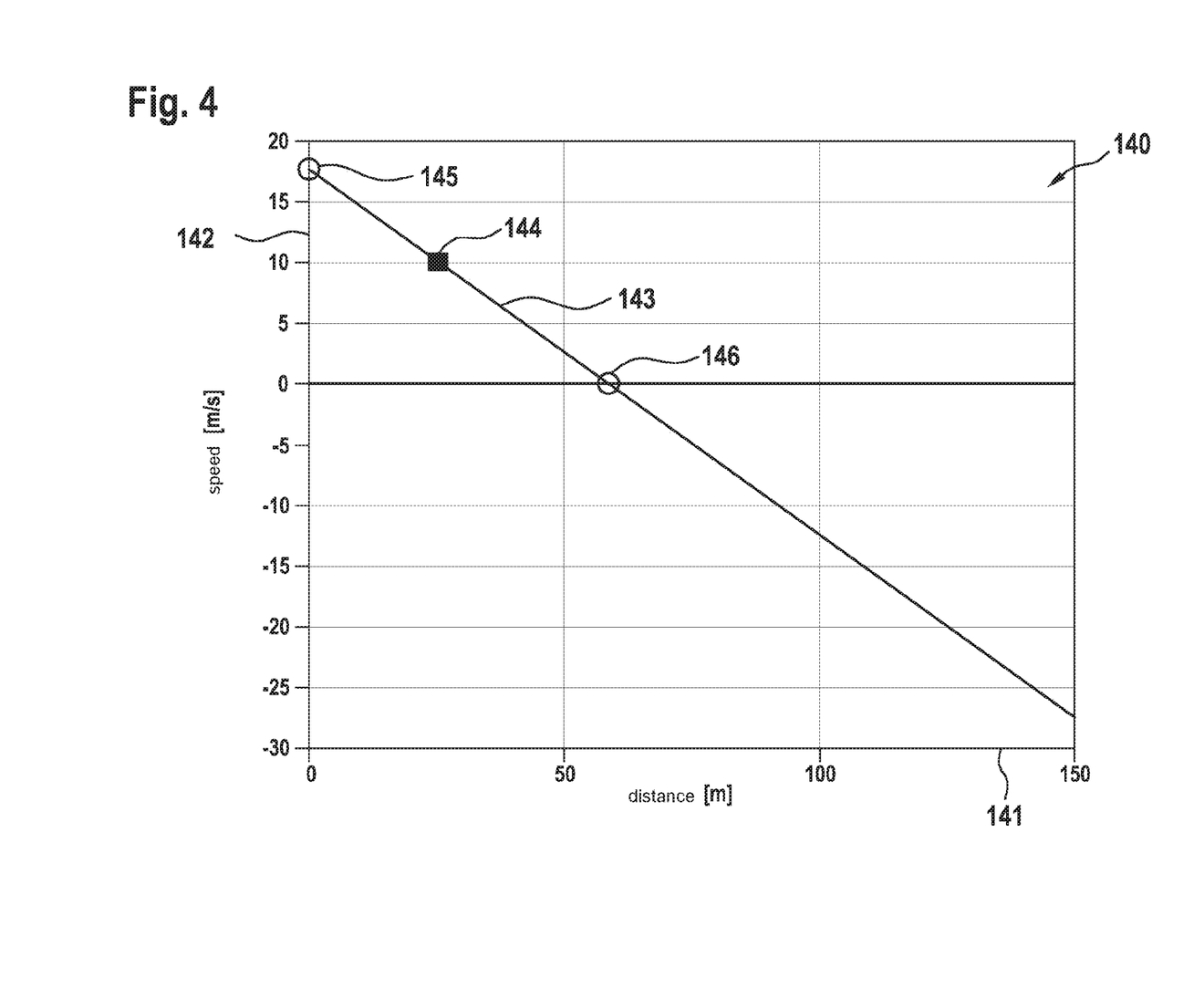

To allow beat frequency 135 to be further analyzed as the sum of the Doppler frequency and the distance frequency, a linear relationship is assumed as illustrated in graph 140 of FIG. 4, in this graph 140 a possible distance of an object 52 in visual field 50 being provided on abscissa 141, and a possible speed of object 52 in visual field 50 being provided on ordinate 142, with speed and distance corresponding to the Doppler frequency and to the distance frequency, respectively. The slope of −1 of a particular straight line and the axis intercepts result for a speed with vanishing distance or for a distance with vanishing speed, and corresponding evaluation of the ascertained value for the beat frequency.

In other words, this means that
(i) for an assumed vanishing distance, the beat frequency is equated to the Doppler frequency in order to ascertain the resulting speed as axis intercept 145 on the ordinate in graph 140 of FIG. 4, and
(ii) for an assumed vanishing speed, the beat frequency is equated to the distance frequency in order to ascertain the resulting distance as axis intercept 146 on the abscissa in graph 140 of FIG. 4.

Figure 5:
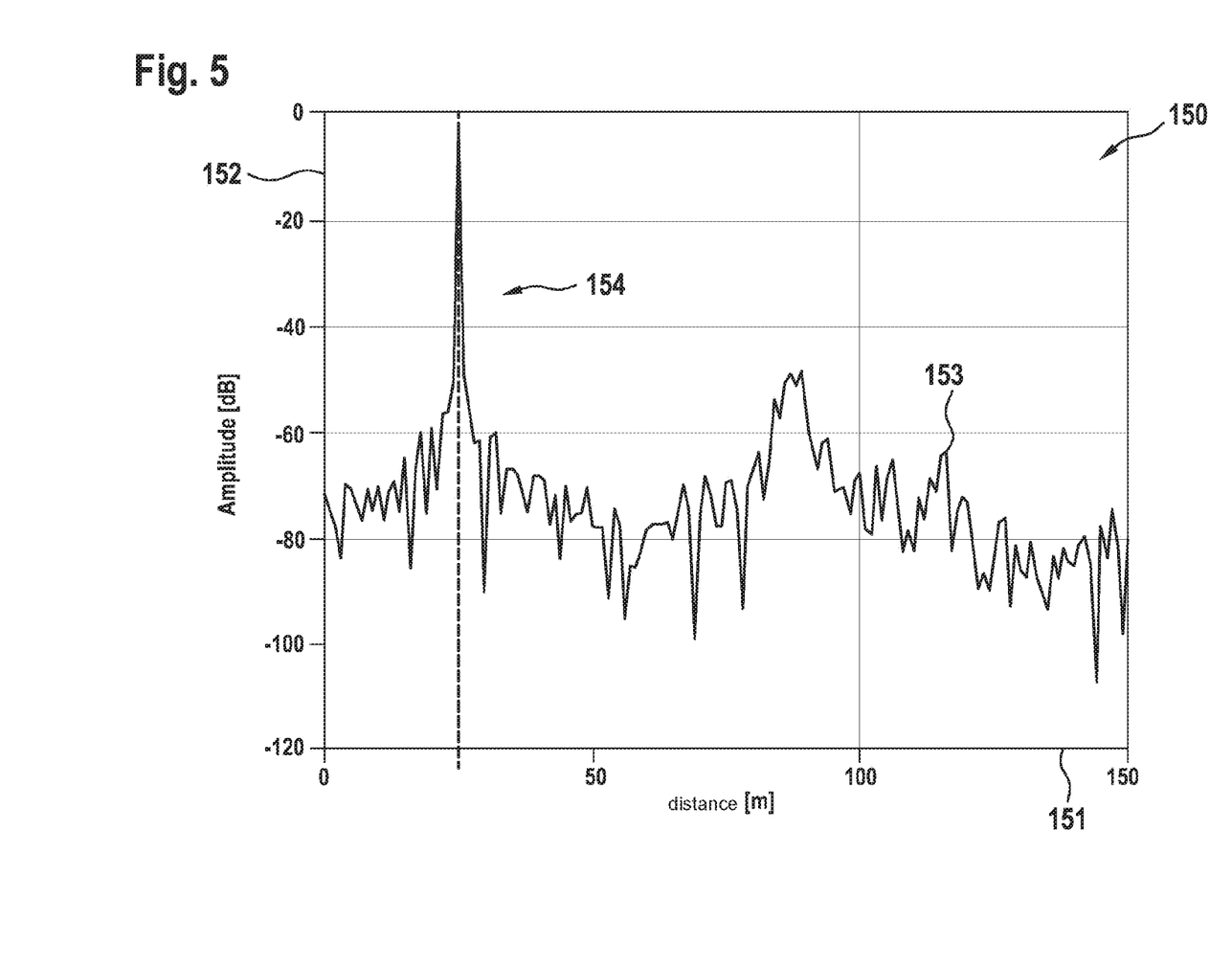
Figure 6:
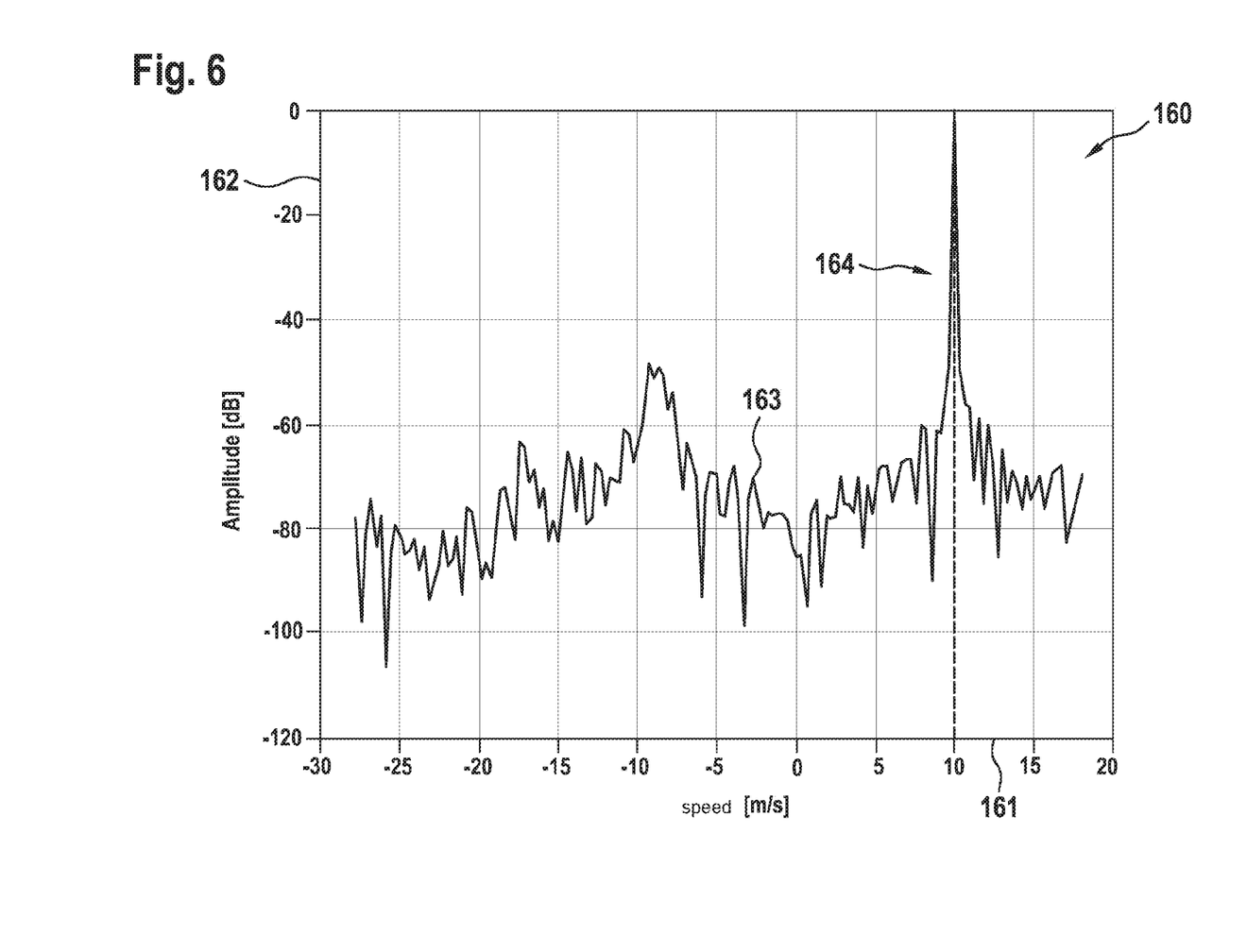

As shown in conjunction with FIGS. 5 and 6, for example via a statistical analysis of second digital evaluation signal A2 from graphs 150 and 160, appropriate values of the distance may be read off on abscissa 151 of graph 150, and values of the speed may be read off on abscissa 161 of graph 160, based on peaks 154 and 164, respectively, of the amplitudes plotted on ordinates 152 and 162, respectively, so that point 144 at a corresponding speed (Y=10.02 here) and at a corresponding distance (X=25 here) may also be obtained for object 52 in visual field 50 in graph 140 of FIG. 4.

These and other features and properties of the present invention are further explained based on the following discussion:

In present LIDAR systems, distance measurements are carried out based on the reflection of laser beams at an object. The object distance is ascertained from the time difference between the transmission and the reception of the LIDAR signal with the aid of the time-of-flight principle. For example, a linear frequency ramp (FMCW) is emitted. The difference frequency between the transmitting ramp and the receiving ramp is ascertained by a coherent reception. The difference frequency, also referred to as the so-called distance frequency, results from the product of the slope of the frequency ramp and the propagation time of the light to the object and back. The difference frequency may be observed as a current signal of a photodiode, the transmission laser beam and the reception laser beam being simultaneously provided on the photodiode and resulting in interference there.

If the target is moving, the distance frequency alone is not observed, since this results in a Doppler shift. In this case the observed frequency, also referred to below as the beat frequency, is the sum of a signed Doppler frequency and the above-described distance frequency.

In this case, with the aid of a single ramp it cannot be unambiguously established, using conventional means, how large the particular components of distance frequency and Doppler frequency are. To resolve this ambiguity, an additional measurement, for example across a second ramp having a different slope, is traditionally necessary. Due to the different slope, the physical distance is mapped onto different distance frequencies, while the frequency shift remains constant due to the Doppler effect.

Two equations for two unknowns result from the measurements, as the result of which Doppler frequencies and distance frequencies may be unambiguously determined.

In contrast to a static scenario, i.e., without the Doppler effect, a scanning LIDAR system must observe each point for at least twice as long in order to resolve the ambiguities. If more than one target is situated in the observed scene, additional ramps are necessary to reliably associate the distance frequencies and Doppler frequencies.

The present invention allows the distance as well as the speed of a target or object 52 in a visual field 50 to be unambiguously determined within a frequency ramp. When there is more than one target or object 52, an association of the particular distances and speeds may be additionally carried out.

The reception signal, in the sense of secondary light 58, is superimposed with the non-modulated carrier signal, in the sense of non-modulated primary light 57-1, from a laser unit 65-1, and both are provided to a sensor 22, for example in the form of a photodiode. This results in interference of the two signals, and during the detection results in a current signal that involves the difference frequency of the two signals.

Due to the superimposition with the non-modulated transmission signal, i.e., non-modulated primary light 57-1 from laser unit 65-1, i.e., the carrier signal, the reception signal is electronically present as a ramp. With the aid of electronic mixing with the original ramp signal, the ramp may then be removed and the signal sampled. This signal involves sinusoidal oscillation, whose frequency corresponds to the sum of the Doppler frequency and the distance frequency.

This frequency, referred to as the beat frequency, may be determined very accurately by a Fourier analysis, for example.

In addition, the entire ramp is sampled, namely, in the electronically unmixed detection signal, in order to unambiguously determine the distance and the speed of the target from the combination of the known beat frequency, which is made up of the sum of the distance frequency and the Doppler frequency, and the information concerning the shape of the ramp or the form of the modulation function in general.

Due to the accurate knowledge of the ramp shape or the form of the general modulation function, the parameters of the ramp may also be determined from an undersampled signal, i.e., from a signal with a sampling rate that is lower than the Nyquist rate, which follows the Nyquist-Shannon sampling theorem.

Schematic figures of a LIDAR system 1 designed according to the present invention is shown as an example in FIGS. 1 and 2.

A laser 65-1 generates a light signal, having an intensity that is constant over time, as non-modulated primary light 57, 57-1 at a fixed wavelength, i.e., in the so-called continuous wave mode.

This non-modulated primary light 57, 57-1 is divided into a local oscillator path and a transmission path. For example, a Mach-Zehnder modulator as a frequency modulator or phase modulator 66-1, or an interconnection of Mach-Zehnder modulators, is situated in the transmission path in order to implement an optical in-phase/quadrature modulator or a simple electro-optical modulator. This modulator 66-1 obtains an electronic modulation signal s(t) as a control signal.

This modulation signal s(t) has the shape, for example, of a frequency ramp that, for example, within 10 μs experiences a frequency deviation of 1 GHz. The modulation values are a function of the system requirements. The values stated here are to be understood only as examples.

The modulation using a frequency ramp as modulation function s(t) allows operation as an FMCW system, since the electronic ramp signal is modulated onto the light signal.

FIG. 1 shows one specific embodiment of LIDAR system 1 according to the present invention in the form of a schematic drawing as an example.

Primary light 57-2, which is modulated using modulation function s(t) and the corresponding signal, is emitted by transmitter optical system 60 as a so-called transmitting ramp, optionally scattered at an object 52 in visual field 50, and once again received.

Receiver optical system 30 may, at least in part, also be the same optical system that is used for the transmission.

After the reception, the optical signal is superimposed with the local oscillator signal, i.e., with non-modulated primary light 57-1 from laser unit 64-1. Superimposed light 59 is provided to a detector, for example a photodiode. The superposition takes place, for example, with the aid of an optical combiner 35-1 or combiners. The two light signals are brought into interference by the superimposition.

The current signal, generated at the photodiode on the detector side as a detector element 22, contains the difference frequency signal.

Instead of a single photodiode as detector element 22, it is also possible to use two photodiodes, which are situated in such a way that they function as a so-called balanced detector. The two outputs, provided in principle at optical combiner 35-1, are each provided to a photodiode, and the differential current between these two photodiodes or detectors 22 in general is further processed. In this way, the effect of possibly occurring intensity noise of laser light source 65-1 may be suppressed, and the direct component of the current signal may be eliminated.

One of the novel features according to the present invention is that the optical reception signal, namely, secondary light 58 from visual field 50, is initially superimposed with non-modulated laser signal 57-1 and brought into interference.

Electronic detection signal D1 is subsequently divided into two paths.

Signal D1 is electronically mixed with ramp signal s(t) in one of the two paths, resulting in so-called dechirping and a first evaluation signal A1' being obtained. The above-mentioned beat frequency, which results from superimposing the distance frequency and the Doppler frequency, may be determined from this signal A1' and its analog-to-digital converted form A1.

An example of a beat frequency for such a measurement is shown in graph 130 of FIG. 3. This frequency is plotted on abscissa 131, with the corresponding amplitude on ordinate 132, and may be measured very accurately.

It is no longer possible to deduce the components of the distance and the Doppler effect, i.e., speed.

Thus, for the stated example of beat frequency, numerous possible combinations of distance and speed of object 52 in visual field 50 result, which when combined would result in the measured beat frequency. These combinations are situated on a straight line, as shown in graph 140 of FIG. 4.

To allow the distance and the speed of object 52 or target in visual field 50 to be determined separately, second signal A2' in analog-digital converted form A2 is used for the evaluation.

The complete ramp is present in this second evaluation signal A2. Although this signal A2 clearly has a larger broadband due to the fact that the ramp is still present, it is, however, not absolutely necessary here to observe the Nyquist-Shannon sampling theorem during the evaluation.

Second evaluation signal A2, since it has not been mixed with modulation signal s(t), i.e., the ramp signal, involves the distance information in the form of a time shift of the transmission signal, as well as the speed information in the form of a constant Doppler shift.

This signal A2 may therefore be used to unambiguously determine the frequency components in the ascertained beat frequency caused by distance and speed.

For this purpose, for each combination of distance and speed in the defined measuring range according to FIG. 4, a check is made as to how well each parameter pair of distance and speed matches the measured ramp parameters. This may take place using a maximum likelihood estimation method, for example.

After this is carried out for all combinations of distance and speed for the given beat frequency, for example an amplitude spectrum is obtained which represents the likelihood of the particular combination.

For the example from FIGS. 3 and 4, the evaluation result is based on the distance values and the speed values illustrated in FIGS. 5 and 6, respectively. It is apparent from these illustrations that the second ramp allows an unequivocal resolution of the ambiguity of the beat frequency. An unambiguous and efficient distance and speed evaluation may thus be carried out with the aid of a single transmitting ramp.

In this regard, FIG. 5 illustrates an unequivocally resolved distance spectrum for the beat frequency according to FIG. 3, using second digital evaluation signal A2. The target distance may be unambiguously determined from the maximum at a distance value of 25 m.

In addition, FIG. 6 shows an unequivocally resolved speed spectrum for the beat frequency according to FIG. 3, using second evaluation signal A2. The target speed may be unambiguously determined from the maximum at a speed value of 10 m/s.

LIDAR systems are suitable for use in driver assistance systems. These are of major importance in particular for use in autonomous driving. However, the use as a sensor in the field of robotics is a further possible application of the present invention.

What is claimed is:

1. A method for operating a LIDAR system, the method comprising:
   using, as a light source unit, a laser device that includes an optical modulator optically coupled thereto for receiving and modulating a frequency of non-modulated light emitted by the laser device, using a frequency modulation function, and for outputting frequency-modulated light as primary light into a visual field;
   optically superimposing secondary light received from the visual field and non-modulated light of the laser device, to form superimposed detection light;
   photoelectrically detecting the superimposed detection light by generating and outputting a primary electrical detection signal that is representative of the detection light; and
   electrically mixing, for an evaluation, the primary electrical detection signal with an electrical signal that is representative of the frequency modulation function of the optical modulator to form a first evaluation signal, and assessing the first evaluation signal.

2. The operating method as recited in claim 1, wherein during the optical superimposition, the received secondary light and the non-modulated light of the laser device are brought into interference with one another.

3. The operating method as recited in claim 1, wherein the electronic mixing of the primary electrical detection signal with the electrical signal which is representative of the frequency modulation function takes place for dechirping and for determining a beat frequency as a sum of a Doppler frequency that is representative of a speed of an object in the visual field, and a distance frequency that is representative of a distance of the object.

4. The operating method as recited in claim 3, wherein the primary electrical detection signal is directly used as a second evaluation signal for the evaluation and is assessed.

5. The operating method as recited in claim 4, wherein the first evaluation signal and the second evaluation signal are assessed jointly with regard to their interdependence.

6. The operating method as recited in claim 4, wherein in the first evaluation signal, a frequency of a main signal component is ascertained as the beat frequency by Fourier analysis.

7. The operating method as recited in claim 6, wherein based on the second evaluation signal, the beat frequency derived from the first evaluation signal, and/or data for defining the frequency modulation function, values that are representative of the speed of the object in the visual field and/or of the distance of the object are ascertained using an estimation method.

8. The operating method as recited in claim 7, wherein the estimating method is a maximum likelihood estimation method.

9. An apparatus for a LIDAR system, comprising:
   a control unit configured to perform the following:
   using, as a light source unit, a laser device that includes an optical modulator optically coupled thereto for receiving and modulating the frequency of non-modulated light emitted by the laser device, using a frequency modulation function, and for outputting frequency-modulated light as primary light into a visual field;
   optically superimposing secondary light received from the visual field and non-modulated light of the laser device, to form superimposed detection light;
   photoelectrically detecting the superimposed detection light by generating and outputting a primary electrical detection signal that is representative of the detection light; and
   electrically mixing, for an evaluation, the primary electrical detection signal with an electrical signal that is representative of the frequency modulation function of the optical modulator to form a first evaluation signal, and assessing the first evaluation signal.

10. A LIDAR system, comprising:
   a transmitter optical system that is configured to generate and emit primary light into a visual field for illuminating the visual field;
   a receiver optical system configured to receive, detect, and evaluate secondary light from the visual field; and
   a control unit configured to control operation of the transmitter optical system and/or of the receiver optical system, wherein the control unit is configured to perform the following:
   optically superimposing the secondary light received from the visual field and non-modulated light of a laser device of the transmitter optical system, to form superimposed detection light;
   photoelectrically detecting the superimposed detection light by generating and outputting a primary electrical detection signal that is representative of the detection light; and
   electrically mixing, for an evaluation, the primary electrical detection signal with an electrical signal that is representative of the frequency modulation function of the optical modulator to form a first evaluation signal, and assessing the first evaluation signal.

11. The LIDAR system as recited in claim 10, wherein:
   the transmitter optical system includes the laser device and an optical modulator coupled to the laser device for receiving and for modulating a frequency of the non-modulated light emitted by the laser device, using a frequency modulation function, and for outputting frequency-modulated light as primary light into the visual field; and/or
   the receiver optical system includes an optical combiner that is configured to optically superimpose the secondary light, received from the visual field, with the non-modulated light of the laser device to form the superimposed detection light; and/or
   an electronic mixer is configured to electronically mix the primary detection signal, which is representative of the superimposed detection light, with the electrical signal which is representative of the frequency modulation function of the optical modulator, for generating the first evaluation signal.

12. A vehicle, comprising:
   a LIDAR system including:

a transmitter optical system configured to generate and emit primary light into a visual field for illuminating the visual field;

a receiver optical system configured to receive, detect, and evaluate secondary light from the visual field; and a control unit configured to control operation of the transmitter optical system and/or of the receiver optical system, wherein the control unit is configured to perform the following:

optically superimposing the secondary light, which is received from the visual field and non-modulated light of a laser device of the transmitter optical system, to form superimposed detection light;

photoelectrically detecting the superimposed detection light by generating and outputting a primary electrical detection signal that is representative of the detection light; and electrically mixing, for an evaluation, the primary electrical detection signal with an electrical signal that is representative of the frequency modulation function of the optical modulator to form a first evaluation signal, and assessing the first evaluation signal.

* * * * *